Nov. 13, 1923.
W. H. ROYLE
HACK SAW
Filed Sept. 5, 1922
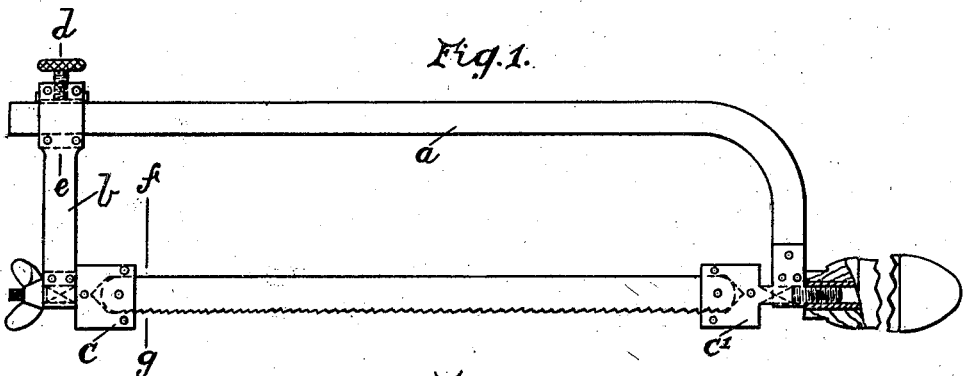
Fig. 1.
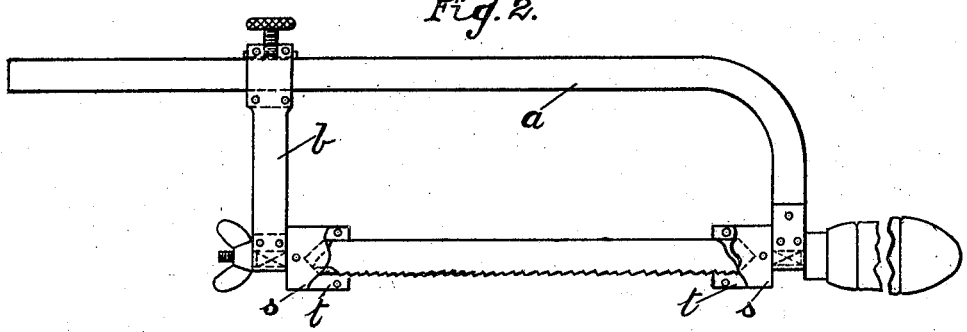
Fig. 2.
Fig. 3.
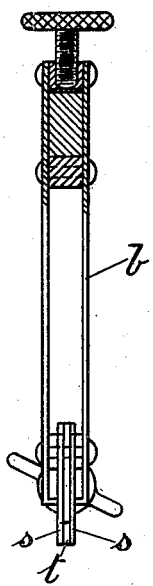
Witnesses.
G. W. Bayly.
H. C. P. Bayly.
Inventor.
William Henry Royle.
per John Pitt Bayly
attorney.

Patented Nov. 13, 1923.

1,474,210

UNITED STATES PATENT OFFICE.

WILLIAM HENRY ROYLE, OF TIPTON, ENGLAND.

HACK SAW.

Application filed September 5, 1922. Serial No. 586,347.

*To all whom it may concern:*

Be it known that I, WILLIAM HENRY ROYLE, a subject of the King of Great Britain, residing at Cloy House, Sedgley Road, W., Tipton, in the county of Staffordshire, in England, have invented a new and useful Improvement in Hack Saws, of which the following is a specification.

This invention relates to an improved hack saw, which has for its object the saving and using of broken saw blades, which are at present useless and lost. And also an improved method of holding new saw blades of any usual length.

In the accompanying drawings Fig. 1, is a side elevation partly in section of the hack saw holding a new blade; Fig. 2, is a like view supporting a broken saw blade, and Fig. 3, is an enlarged cross sectional elevation on lines $d. e.$ and $f. g.$ on Fig. 1.

My invention is constructed from a solid steel frame A, having an adjustable arm B, mounted thereon, which latter can slide laterally along the said frame A, and is rigidly held in any desired position by means of a milled head screw D, passing through the top of the adjustable arm B, and engaging with the frame A, as shown in Figs. 1, 2, and 3.

The lower end of the adjustable arm B, supports a saw blade holder C, in a well known manner, said holder C, comprises two metallic plates S, with a center plate T, of carbonized steel forming a socket, being riveted together for receiving the end of the saw blade. Said socket is tapered on the inside for the purpose as hereinafter described.

A saw blade holder $C^1$, having two plates S, and a center plate T, forming a socket corresponding to the above described saw blade holder C, engages with a suitable handle and supports the aforesaid frame A, in a rigid position as shown in Figs. 1 and 2.

In Fig. 1, I show the hack saw holding a new saw blade by means of the saw blade holders C, and $C^1$, carried by the frame A, and adjustable arm B, respectively, and secured by a split pin at each end. The new saw blade being put under tension in the usual manner.

A broken hack saw blade is mounted in the hack saw by means of one end being inserted into the holder $C^1$, and the adjustable arm B, is then moved laterally along the frame A, until the socket C, engages with the opposite end of the broken saw blade, the latter secured in position by compression applied to the said arm B, which in turn is then rigidly held by tightening the milled head screw D. The tapered recess provided in the sockets of the holders C, and $C^1$, allows for better support of a broken saw blade as shown in Fig. 2.

From the foregoing description it will readily be seen how any length of broken saw blade may be utilized, thereby giving a great saving by using such blades.

I claim:—

In a hack saw the combination of a steel frame having an adjustable arm moving laterally thereon, a milled head screw securing the adjustable arm to the frame, saw blade holders comprising two plates with a center plate forming a socket, said socket provided with a tapered recess for easy insertion of a broken saw blade substantially as described.

WILLIAM HENRY ROYLE.